United States Patent [19]

Witt et al.

[11] 4,256,798

[45] Mar. 17, 1981

[54] MOISTURE-RESISTANT FIRE-RETARDANT DECORATIVE FLOOR AND WALL COVERINGS AND PROCESS FOR THE MANUFACTURE THEREOF

[75] Inventors: Alvin E. Witt, Media; Lewis R. Bosco, Lemont, both of Pa.

[73] Assignee: PermaGrain Products, Inc., Media, Pa.

[21] Appl. No.: 966,553

[22] Filed: Dec. 5, 1978

[51] Int. Cl.³ .................. B32B 7/02; B32B 19/08; B32B 21/04
[52] U.S. Cl. .................... 428/215; 156/288; 156/323; 428/443; 428/445
[58] Field of Search .............. 428/215, 40, 203, 343, 428/346, 351, 352, 354, 355, 443, 213, 214, 445, 511–514; 156/241, 288, 323

[56] References Cited

U.S. PATENT DOCUMENTS

| | | | |
|---|---|---|---|
| 461,264 | 10/1891 | Koskul | 428/79 |
| 2,266,699 | 12/1941 | Williamson | 428/337 |
| 2,455,777 | 12/1948 | Jones | 428/207 X |
| 2,599,359 | 6/1952 | Banks et al. | 428/40 X |
| 2,680,700 | 6/1954 | Meyers | 428/215 |
| 2,987,103 | 6/1961 | Yakubik | 428/203 |
| 3,135,647 | 6/1964 | Wheeley | 428/49 X |
| 3,196,494 | 7/1965 | Hartman et al. | 428/443 X |
| 3,231,457 | 1/1966 | Meissner | 428/86 |
| 3,480,494 | 11/1969 | Wilhelm | 428/443 X |
| 3,522,140 | 7/1970 | Hartzell et al. | 428/354 X |
| 3,753,827 | 8/1973 | Kober | 428/443 X |
| 3,770,536 | 11/1973 | Haigh | 156/241 X |
| 3,924,023 | 12/1975 | Boranian et al. | 428/443 X |
| 3,994,110 | 11/1976 | Ropella | 428/443 X |

*Primary Examiner*—William J. Van Balen
*Attorney, Agent, or Firm*—Eugene E. Renz, Jr.

[57] ABSTRACT

Improved moisture-resistant fire-retardant decorative floor and wall covering laminates and a method for making the same are described, having an asbestos backing, an intermediate layer of wood veneer and a face wear-resistant layer of vinyl, through which the decorative wood veneer may be seen. The vinyl wear resistant layer is usually clear and colorless. An optional colored vinyl layer may be laminated between the wood veneer and asbestos layer. The asbestos backing resists moisture penetration and transmits the moisture laterally to the edges of the laminate where it escapes. The asbestos and the vinyl face protect the wood veneer from fire, thus providing a highly fire-retardant and moisture-resistant, but decorative floor and wall covering.

9 Claims, No Drawings

MOISTURE-RESISTANT FIRE-RETARDANT DECORATIVE FLOOR AND WALL COVERINGS AND PROCESS FOR THE MANUFACTURE THEREOF

BACKGROUND OF THE INVENTION

The inherent attractiveness of wood, and especially fine wood veneers, has been recognized for many years and veneers have been widely employed in the manufacture of furniture and for other decorative purposes, despite the difficulty of applying such veneers and protecting them from moisture and wear. Various approaches to these problems have been suggested.

THE PRIOR ART

Williamson U.S. Pat. No. 2,266,699 issued Dec. 16, 1941 describes a method for protecting wood veneers from moisture in which one side of the veneer is coated and impregnated with vulcanized latex and the other side is finished with a synthetic resin, after thoroughly drying the veneer.

Banks et al U.S. Pat. No. 2,599,359 issued June 3, 1952 relates to a method of joining fabrics other than by stituching which employs a double faced tape coated with a pressure sensitive adhesive; the tape forming a laminate holding the fabric sheets together.

Meyers U.S. Pat. No. 2,680,700 issued June 8, 1954 relates to laminated sheets, particularly a resin-surfaced sheet having a rubber backing adhered thereto. More specifically, thin flexible decorative laminated sheets are described comprising in sequence, a hard smooth outer transparent layer of a malamine formaldehyde resin impregnated paper, a next underlying layer of decorative paper impregnated with a melamine formaldehyde resin, a third layer comprising a double ply of paper impregnated with phenol formaldehyde resin, and a base layer of a flexible resiliently deformable elastomer, all of these layers being directly united together and the outer resin layer having a smooth hard surface. Such laminated sheets are applied to wood, fiberboard, metal, pressed board or plaster surfaces by linoleum cements for use as desks, tables, countertops and the like.

Wheeley U.S. Pat. No. 3,135,647 issued June 2, 1964 relates to a decorative adhesive vapor-proofing floor and wall surface tile, comprising a tile coated on the underside with a self-adhesive coal tar pitch composition, the outer surface of the coal tar pitch composition layer being protected by a release paper.

Hartzell et al U.S. Pat. No. 3,522,140 issued July 28, 1970 describes durable sheet products comprising a coated asbestos sheet material adhered to a cellular foam substrate. The foam or asbestos layers may also be provided with an adhesive layer for attaching the laminate to another surface.

Haigh U.S. Pat. No. 3,770,536 issued Nov. 6, 1973 relates to a method of making and installing a laminated product which may include a wood veneer and polyvinyl chloride layer and an asbestos substrate, which comprises applying a rubber base elastomeric coating to the asbestos, drying to a non-tacky state and applying a release paper thereto, among other steps.

It will be seen from the foregoing that the problems associated with the manufacture and installation of laminates incorporating a wood veneer are well known in the art and that although a variety of solutions have been suggested, these problems have not been entirely overcome. Therefore, a need remains in the art for improved wood veneer laminates for use as decorative floor and wall coverings.

It is an object of the present invention, therefore, to provide improved wood veneer decorative wall and floor coverings.

It is another object of the invention to provide an improved method for making such decorative wall and floor coverings.

It is still another object of the invention to provide moisture-resistant and fire retardant decorative wood veneer laminates.

SUMMARY OF THE INVENTION

The foregoing and other objects of the invention are achieved by providing a moisture-resistant, fire-retardant laminate for use as a floor and wall covering, comprising a moisture-transmitting, flexible asbestos-containing backing layer, an intermediate layer of wood veneer having a thickness in the range from about 1/85" up to about 1/45", and an outer wear layer of see-through vinyl having a thickness in the range from about 6 to about 20 mils and a cold crack temperature in the range from about $-25°$ F. to about $32°$ F., the layers being adhesively laminated together to form a unitary laminate having the appearance of wood but being highly fire-retardant and capable of transmitting moisture in contact with the backing layer to the edges of the laminate where it escapes without penetrating the laminate and damaging the wood veneer.

The invention also includes a process for the production of the moisture-resistant and fire-retardant laminates, which comprises assembling a plurality of pre-built assemblies comprising an outer layer of see-through, wear-resistant vinyl having a thickness of about 6 to about 20 mils, an intermediate layer formed from strips of wood veneer having a thickness in the range from about 1/85" to about 1/45", the strips having been coated on both sides with from about 6 to about 20 mils of adhesive and the adhesive dried. A flexible layer of asbestos is also added to each pre-built assembly as a base layer before fastening the pre-built assemblies together by temporary means such as staples. A plurality of the pre-built assemblies are then stacked face to back with a plurality of textured high pressure laminate boards, one board between each pair of pre-built assemblies. A layer of release paper is placed between each pre-built assembly and the adjacent board and on the top and bottom of the stack so that the face and back of each pre-built assembly is protected thereby. The stack of pre-builts is placed in a plywood-type press with an aluminum sheet on the top and bottom of the stack. The press is closed by conventional means and heat and pressure applied for a time and under conditions to cure the adhesive in the pre-builts and form unitary laminates therefrom. The press is cooled and opened and the laminates are edge trimmed to remove the stapled selvage to provide the finished commercial decorative laminates which are normally 4' by 8' sheets, but which may be of any other suitable size.

DETAILED DESCRIPTION OF THE INVENTION

The moisture-resistant, fire-retardant laminates of the invention, which are useful as floor or wall coverings and which have the appearance of natural wood are in the broadest aspect of the invention, three-ply laminates. The natural wood appearance of the laminates is obtained by the use of a layer of wood veneer. Inasmuch as the laminates are preferably manufactured in 4'×8' sheets to meet the custom of the art, the wood veneer layers must be assembled from strips of veneer of whatever widths are available. The wood veneer layer may have any thickness up to about 1/45" thick. While thicker veneers could be employed they are, of course, less flexible and thus more subject to cracking and splitting and are also less economical in the use of finely grained or decorative wood. It is preferred to employ wood veneer of about 1/85" thickness because that is about the maximum thickness at which the strips of veneer may be assembled into a layer by lap-joining without the overlapping joints being unduly visible. Veneers of less than about 1/85" thickness may be employed but such veneers are more delicate and, therefore, more difficult to handle without damage. Veneers thicker than 1/85" up to about 1/45" thick may be employed, but due to their thickness they must be butt-joint assembled in order to avoid unsightly joints which detract from the natural appearance of the layer of wood veneer. Butt-jointing is, of course, a more difficult and, therefore, more costly method of forming the veneer layers, since it requires greater precision in the cutting of the strips to provide exactly straight and parallel edges. It has been found, therefore, that the preferred practice is to employ strips of veneer of about 1/85" thickness and to assemble them into a veneer layer 4' wide by overlapping joints of up to about ½" in width.

The laminates are manufactured in 4'×8' sheets by first cutting rolled vinyl sheet 50" wide into 99" lengths to provide a 2" oversize width and 3" oversize length to the sheet. Any suitable commercially available calendered vinyl sheeting may be employed having a thickness of from about 6 to about 20 mils (0.006 to 0.0020"). It is preferred that the vinyl have a medium to stiff hand; the preferred hand being stiff, i.e. about +24. Calendered vinyls are preferred due to their superior uniformity of thickness. The vinyl should be resistant to cracking, particularly at low temperatures. A cold cracking characteristic of at least about 32° F. is acceptable but it is preferred that the material not crack at about 0° F. and still more preferably, that the vinyl resist cracking down to about −25° F. A preferred commercially available vinyl sheeting has a specific gravity of from about 1.24 to about 1.30; 1.27 being typical; a Shore A hardness in the range from 94 to 100, 98 being typical; a tensile strength in the range from about 3333 to 3905 psi; a 100% modulus of elasticity in the range from about 2762 to about 3143 psi; an ultimate elongation of about 210 to 240%; and a Graves tear strength, die C, of about 14.5 to 15.0 psi.

After cutting the veneer, preferably 1/85" thick into 99" strips and squaring the edges, both sides of the strips are coated with a suitable adhesive at a wet thickness in the range from about 6 to about 12 mils. While any suitable adhesive may be employed, water based acrylic adhesives are preferred. The adhesive is then dried in an infrared oven or otherwise.

The strips of adhesive-coated veneer are then assembled on the sheet of vinyl to form the veneer layer. As noted above, if the veneer strips are about 1/85" thick they may be lap-jointed with their edges overlapping up to about ½". If the veneer strips are thicker than about 1/85" up to about 1/45" thick they must be assembled with their edges in butt-jointed relation.

The backing layer is then cut from a roll of asbestos or asbestos-containing sheet, into a 50" by 99" sheet, and laid on the optional colored vinyl layer if employed, or on the assembled veneer layer which in turn is laid on the vinyl sheet. The four edges of the sandwich made in this way, or just two of the edges are temporarily mechanically fastened as by staples to hold the so-called pre-built assembly together.

A plurality of the "pre-builts" or stapled assemblies are then stacked. From 1 to 10, but usually 5 to 10 pre-builts are placed in each stack or "book"; the number depending only upon the capacity of the press. The pre-builts are stacked in face to back relation with a textured high pressure laminated type board between each adjacent pair of pre-builts with a sheet of release paper between the board and the pre-built above and below the board. In this way each board functions on the face of one-prebuilt and on the back of another, through the release paper in both cases. A sheet of release paper is also placed on the top of the stack on the face of the uppermost pre-built. Another sheet of release paper is placed on the bottom of the stack, i.e. on the bottom of the lowermost pre-built. The release papers keep the boards from direct contact with the surfaces of the pre-builts. The stack or book is then enlarged by placing a plurality of sheets, typically 7, of 20 mil Kraft paper on the top and bottom of the stack. The stack or book is completed by placing a metal sheet, typically ⅛" thick aluminum on the top and bottom of the stack.

Nine stacks or books of 1 to 10 pre-builts, each with its outer aluminum sheets, are then loaded into a conventional plywood press having ten openings. The press is then closed with the aid of a low pressure pump and heat and pressure applied to cure the adhesive and laminate the pre-builts. The heat may be supplied by steam or otherwise and is in the range from about 150° to 300° F. The pressure is increased by means of a high pressure pump to about 2000 to 4000 psig. When the adhesive is cured and the vinyl is fused, the press and its contents are cooled, usually by water circulated in place of the steam. The pressure may be increased during the cooling cycle. The press is then opened, the stacks removed, and the laminated 50"×99" sheets are cut to size 4'×8' to eliminate the stapled edges.

The finished laminated sheets have the appearance of natural wood on the face side and of the asbestos sheet on the back. The see-through vinyl surface over the wood veneer is highly wear and scratch resistant and is virtually invisible. The sheets when installed on a wall or floor by the use of conventional flooring mastic, are highly resistant to penetration by moisture and, indeed, have the property of transmitting any moisture to the edges of the sheet where it may escape without causing damage to the decorative laminate. Inasmuch as the laminates contain only a very thin veneer of wood permanently sealed between the virtually non-combustible vinyl and asbestos sheets, the laminates are highly fire retardant. Therefore, the new laminates provide the decorative values of natural wood while meeting the requirements of all known fire regulations, thus affording both safety and beauty.

EXAMPLE

In order to illustrate the invention more specifically, a batch of pre-builts was assembled employing 20 mil, calendered clear vinyl having a +24 hand as the wear resistant facing, cut into 50"×99" sheets. Strips of 1/85" thick wood veneer were cut into 99" lengths and the edges trimmed square and then coated on both sides with 12 mils of a water based acrylic emulsion adhesive, available as AC-61 from Rohm & Haas Co. The coated strips were then dried in an infrared oven and assembled to form a veneer sheet 50"×99" by laying them on the vinyl sheet with about ½" overlapping at the edges of adjacent strips. The asbestos backing sheets 50"×99" were cut from a roll of Armstrong Cork Co. AS-422 Armotex asbestos sheeting, and placed over the wood veneer. The edges of the assembly were then stapled together to form the pre-builts. The pre-builts were stacked into books of 10 as described above employing high pressure laminate boards between each pair of adjacent pre-builts and release paper adjacent each face of each pre-built. Seven sheets of 20 mil Kraft paper were then placed on the top and bottom of each stack followed by a ⅛" thick sheet of aluminum.

Nine stacks were placed in a plywood press having 10 openings. The press was closed with the aid of a low pressure pump at 200 psig. Steam at 310° F. was introduced to the press and the pressure was increased on the press in the 50"×101" press area over the stacks of pre-builts by the use of a high pressure pump. The cure was carried out at 3200 psig, maintaining the temperature at 290° F. for 50 minutes. An iron-constantan thermocouple was placed in the center of the center book or stack to monitor the temperature. The pressure was then increased to 3500 psig and cooling water was supplied to the press and the stacks cooled to 100° F. before the press was opened after releasing the pressure. The stacks were then removed and disassembled and the completed laminates were edge trimmed to 4'×8' sheets. These sheets can be cut to smaller sizes, such as 12"×12" tiles.

What is claimed is:

1. A moisture-resistant, fire-retardant laminate for use as a floor and wall covering, comprising
   (a) a moisture-transmitting, flexible, asbestos-containing backing layer;
   (b) an intermediate layer of wood veneer having a thickness in the range from about 1/85" up to about 1/45"; and
   (c) an outer wear layer of see-through vinyl having a thickness in the range from about 6 to about 20 mils and a cold crack temperature in the range from about −25° F. to about 32° F.; said layers being adhesively laminated together to form a unitary laminate having the appearance of wood but highly fire-retardant and capable of transmitting moisture in contact with said backing layer to the edges of said laminate.

2. A laminate according to claim 1 wherein the vinyl layer has a medium to stiff hand.

3. A laminate according to claim 1 wherein the layers are adhesively laminated with a water based acrylic adhesive.

4. A laminate according to claim 1 having in addition a calendered layer of colored see-through vinyl laminated between said layer of wood veneer and said asbestos layer.

5. A laminate according to claim 1 wherein the layer of wood veneer is formed of strips having a width less than the width of said laminate and having a thickness greater than 1/85" but not more than about 1/45", said strips of veneer being butt-jointed to form said layer.

6. A laminate according to claim 1 wherein the layer of wood veneer is formed of strips having a width less than the width of said laminate and having a thickness of no greater than about 1/85", said strips of veneer being lap-jointed to form said layer.

7. A moisture-resistant, fire-retardant laminate according to claim 1 having the appearance of wood and being suitable as a wall and floor covering, comprising
   (a) a flexible asbestos backing layer;
   (b) an intermediate layer of wood veneer composed of strips of veneer of about 1/85" thickness lap-jointed to form said layer; and
   (c) an outer layer of see-through vinyl about 20 mils thick, said vinyl having a hand of about +24 and a cold crack temperature not above about 0° F.

8. A process for the production of moisture-resistant fire-retardant laminate for use as a floor and wall covering, which comprises:
   (a) assembling a plurality of pre-built assemblies comprising an outer layer of see-through, wear resistant vinyl having a thickness of about 6 to about 20 mils; an intermediate layer formed from strips of wood veneer having a thickness in the range from about 1/85" to about 1/45", said strips having been coated on both sides with from about 6 to about 20 mils of adhesive and said adhesive dried; and a flexible backing layer of asbestos; and temporarily mechanically fastening each of said pre-built assemblies together;
   (b) stacking a plurality of said pre-built assemblies face to back with a plurality of textured high pressure laminate boards, one of said boards separating each pair of adjacent pre-built assemblies and with a layer of release paper in contact with the face and back of each pre-built assembly in the stack;
   (c) placing said stack in a plywood-type press with an aluminum sheet on the top and bottom of the stack;
   (d) closing the press and heating the stack under conditions of heat, pressure and time sufficient to cure the adhesive and foam unitary laminates of said pre-built assemblies.

9. A process according to claim 8 wherein the adhesive is a water based acrylic adhesive and the laminating operation is carried out at a temperature in the range from about 150° to about 300° F. at a pressure in the range from about 2000 to about 4000 psig.

* * * * *